United States Patent [19]

Sandvik

[11] Patent Number: 4,500,062
[45] Date of Patent: Feb. 19, 1985

[54] ADJUSTABLE SEAT LEVELING MECHANISM

[75] Inventor: Leonard E. Sandvik, Cedar Falls, Iowa

[73] Assignee: Deere & Company, Moline, Ill.

[21] Appl. No.: 441,357

[22] Filed: Nov. 15, 1982

[51] Int. Cl.³ .............................................. B60N 1/02
[52] U.S. Cl. .................................... 248/371; 297/314
[58] Field of Search ............... 248/371, 372.1, 393, 248/394, 395, 346, 228, 424, 429, 430, 407–409; 297/314, 315, 258, 261, 420; 272/54, 56, 146; 296/65 R; 74/540

[56] References Cited

U.S. PATENT DOCUMENTS

| | | | |
|---|---|---|---|
| 2,961,269 | 11/1960 | Renfroe | 248/228 |
| 3,007,668 | 11/1961 | Dall | 248/429 |
| 3,466,089 | 9/1969 | Stueckle | 297/314 |
| 3,627,253 | 12/1971 | Germain | 248/429 |
| 4,210,303 | 7/1980 | Torta . | |
| 4,378,101 | 3/1983 | Kazaoka | 248/429 |
| 4,422,690 | 12/1983 | Kopich . | |

FOREIGN PATENT DOCUMENTS

| | | | |
|---|---|---|---|
| 1923159 | 11/1970 | Fed. Rep. of Germany | 248/420 |
| 1208859 | 10/1970 | United Kingdom | 248/429 |
| 1327027 | 8/1973 | United Kingdom . | |

Primary Examiner—William H. Schultz
Assistant Examiner—Robert A. Olson

[57] ABSTRACT

An adjustable seat leveling mechanism includes a pair of elongated, arcuate and T-shaped rails mounted on a platform which is fixed to a vehicle. A pair of guides have elongated arcuate slots which receive the rails so that the guides, which support a vehicle seat, are laterally movable along an arc of a circle. A toothed rack projects outwardly from one of the guides. A lever is pivotally mounted on the platform and is biased toward engagement with the rack to releasably hold the seat in selected positions. An operating lever is mounted on an arm rest of the seat and is coupled to the lever by a cable linkage.

4 Claims, 4 Drawing Figures

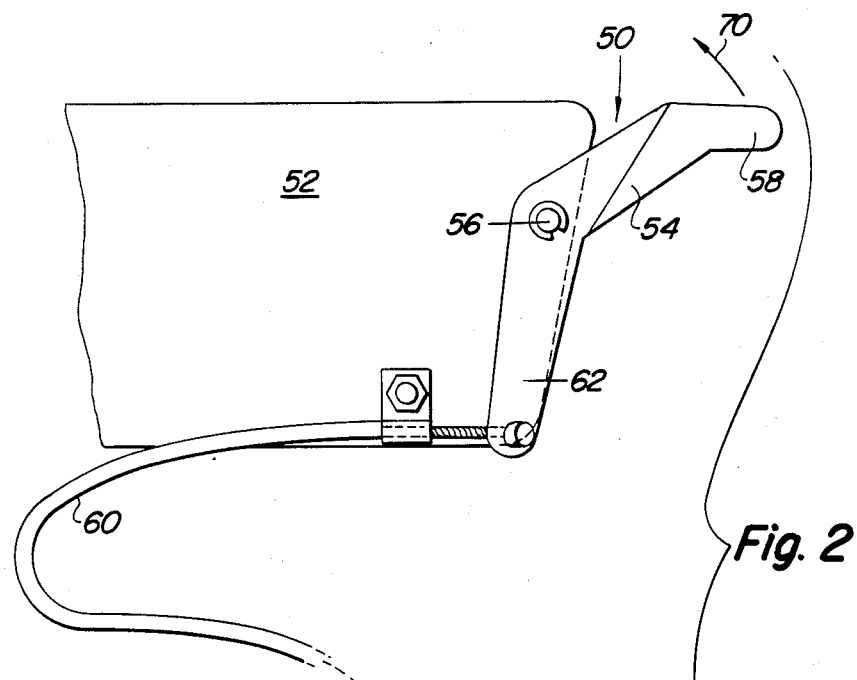
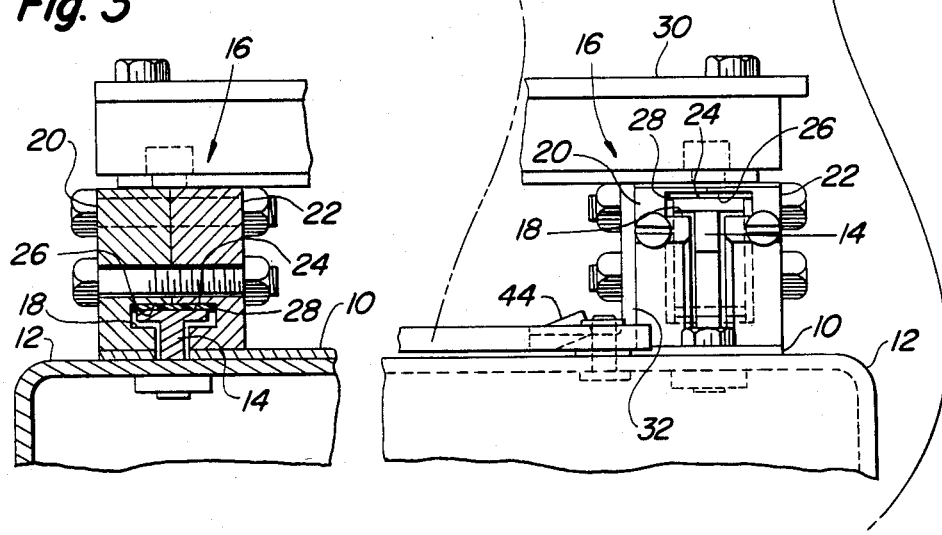

4,500,062

ADJUSTABLE SEAT LEVELING MECHANISM

BACKGROUND OF THE INVENTION

The present invention relates to an adjustable seat support mechanism, such as for supporting a seat in an agricultural vehicle.

Off-highway vehicles, such as agricultural tractors, often operate over inclined or side hill terrain. In order to reduce operator fatigue, there have been proposed adjustable support mechanisms for automatically or manually leveling the operator's seat under such conditions. Certain of these mechanisms utilize track and roller bearing support members. However, the low friction of such supports can permit overly abrupt seat movements unless additional damping is provided, such as the fluid damping described in U.S. Pat. No. 3,632,076. Furthermore, such systems produce point loading of the members which bear against the roller bearings. Such point loading requires that the bearing surfaces be treated, such as by case hardening, in order to support such loads. Such point loading can also create undesirable stresses upon structural members when the seat is subjected to seat belt stress forces. Low friction bearing supports also have a certain amount of free play which can produce undesirable noise and vibration which reduces operator comfort.

Conventional seat leveling supports also provide latching mechanisms which releasably hold the seat in selected positions. However, some of these latching mechanisms are inconvenient to operate. For example, the latch mechanism of U.S. Pat. No. 3,466,089 requires the operator to grasp a dog which is mounted underneath the front part of the seat. Other latch mechanisms, such as those described in U.S. Pat. Nos. 937,922 and 1,039,004, have parts which extend outwardly from the seat and could interfere with the utilization of space within a vehicle operator's compartment. Accordingly, it would be desirable to provide a seat leveling mechanism which is rugged, noise and vibration resistant, which has a compact latching mechanism and which does not require hydraulic damping.

SUMMARY OF THE INVENTION

An object of the present invention is to provide a seat leveling support system which is simple, yet rugged and free from noise and vibration.

A further object of the present invention is to provide such a seat support with a compact latching mechanism.

Another object of the present invention is to provide such a seat support system which does not require hydraulic damping.

These and other objects are achieved by the present invention which includes a pair of elongated arcuate rails fixed to a platform. A pair of elongated guide members are fixed to the bottom of the vehicle seat and have arcuate slots which receive the rails. Elongated plastic bearing members are located in the slots between an upper surface of the rails and the guide members. An arcuate toothed rack projects from the side of one of the guide members. A lever is pivotally supported on the platform for engagement with the rack. Abutments at opposite ends of the rack are engageable with the lever to limit motion of the seat relative to the platform. A linkage connects the lever to a control member pivotally mounted on an arm rest of the seat.

BRIEF DESCRIPTION OF THE DRAWINGS

FIG. 2 is a right-hand, side elevational view which includes an end view of a front guide member of the present invention;

FIG. 3 is a sectional view taken through the mid portion of the rear guide member of the present invention.

DETAILED DESCRIPTION

A seat support system includes a platform 10 for securing to a vehicle frame 12. A pair of laterally extending, elongated and arcuate rails 14 with T-shaped cross sections are fixed to the front and rear ends of the platform 10.

Figure 1:
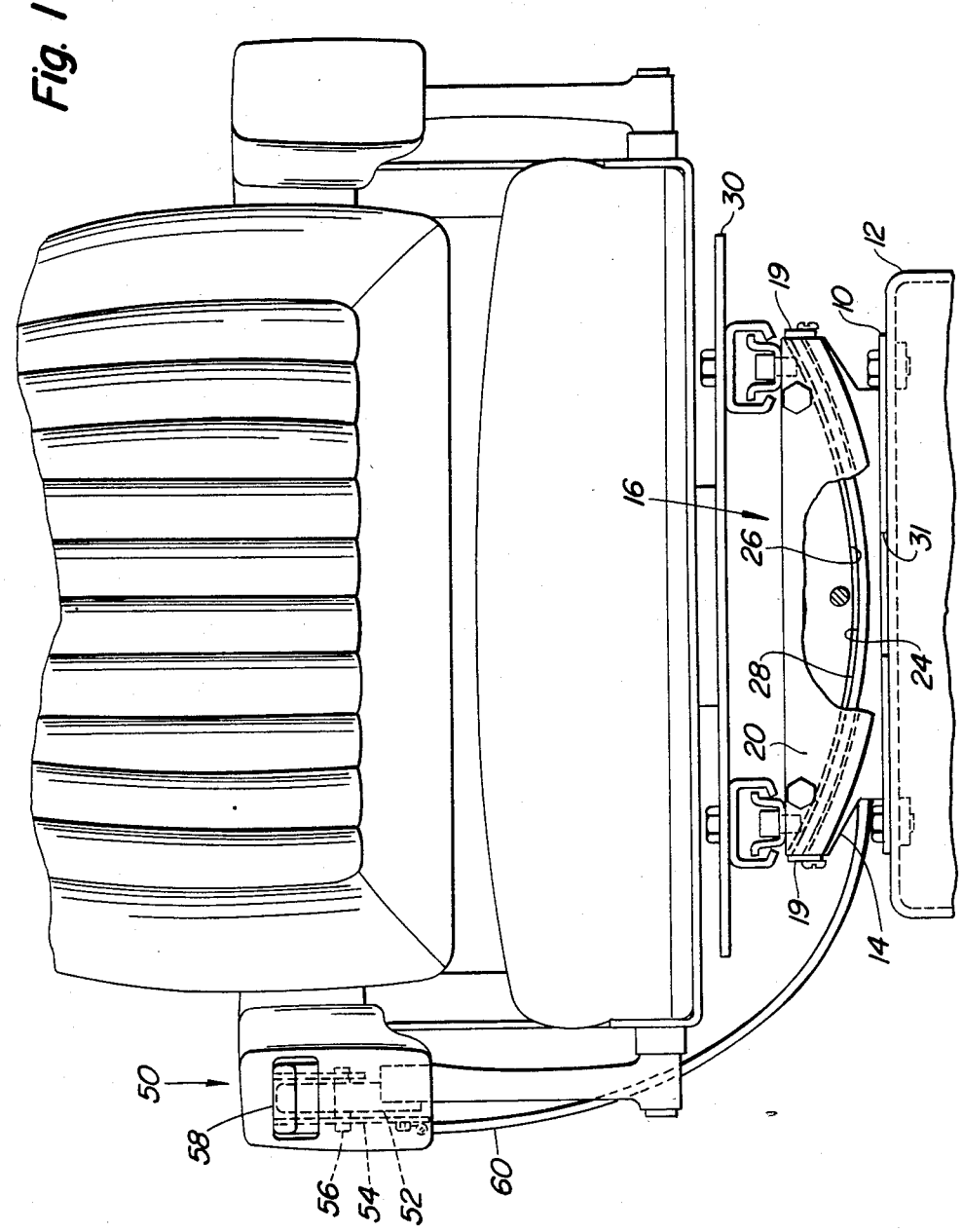
FIG. 1 is a front view of a seat assembly, including the present invention, with portions removed for clarity.

A pair of elongated guide members 16 have arcuate T-shaped slots 18 which receive the rails 14. The guides 16 are preferably formed by complimentary halves 20 and 22 which are bolted together on opposite sides of each rail 14. The entire upper surface 24 of the rail 14 and the corresponding lower surface 26 of the guides 16 form bearing surfaces over which seat loads are spread. Sheets 28 of bearing material, such as plastic, are retained in the slots 18 by end plates 19 between bearing surfaces 24 and 26. In fact, when the seat support system is centered side-to-side, as seen in FIG. 1, the entire laterally-extending lower surface 26 of guide 16 is in contact with the bearing sheet 28 which, in turn, is in contact with the entire upper surface 24 of rail 14. A seat base 30 is bolted on top of the guides 16 for supporting the vehicle seat thereon. Thus, the rails 14 and the guides 16 cooperate to allow the base 30, and the seat attached thereto, to pivot laterally along an arc of a circle having a center in the region of the hips of a vehicle operator. Apertures 31 are formed in the platform 10 to allow clearance for the guides 16.

A bracket 32 is fixed to the side of guide half 20 of the front guide member 16 and includes a horizontally and laterally extending arcuate toothed rack 34. Abutment members 36 and 38 extend from the ends of rack 34. A lever 40 is pivotal on the platform 10 about a pivot 42 with a vertically extending pivot axis. The lever 40 includes a lug 44 which is receivable by the notches between the teeth of rack 34 to releasably hold the guides 16 and the seat in selected positions. The lug 44 is also engageable with abutments 36 and 38 to limit the lateral movement of the seat. A spring 46 biases the lever 40 towards engagement with the rack 34. A stop 48 projects above the platform 10 and is engageable with the lever 40 to limit its movement away from rack 34.

Figure 4:
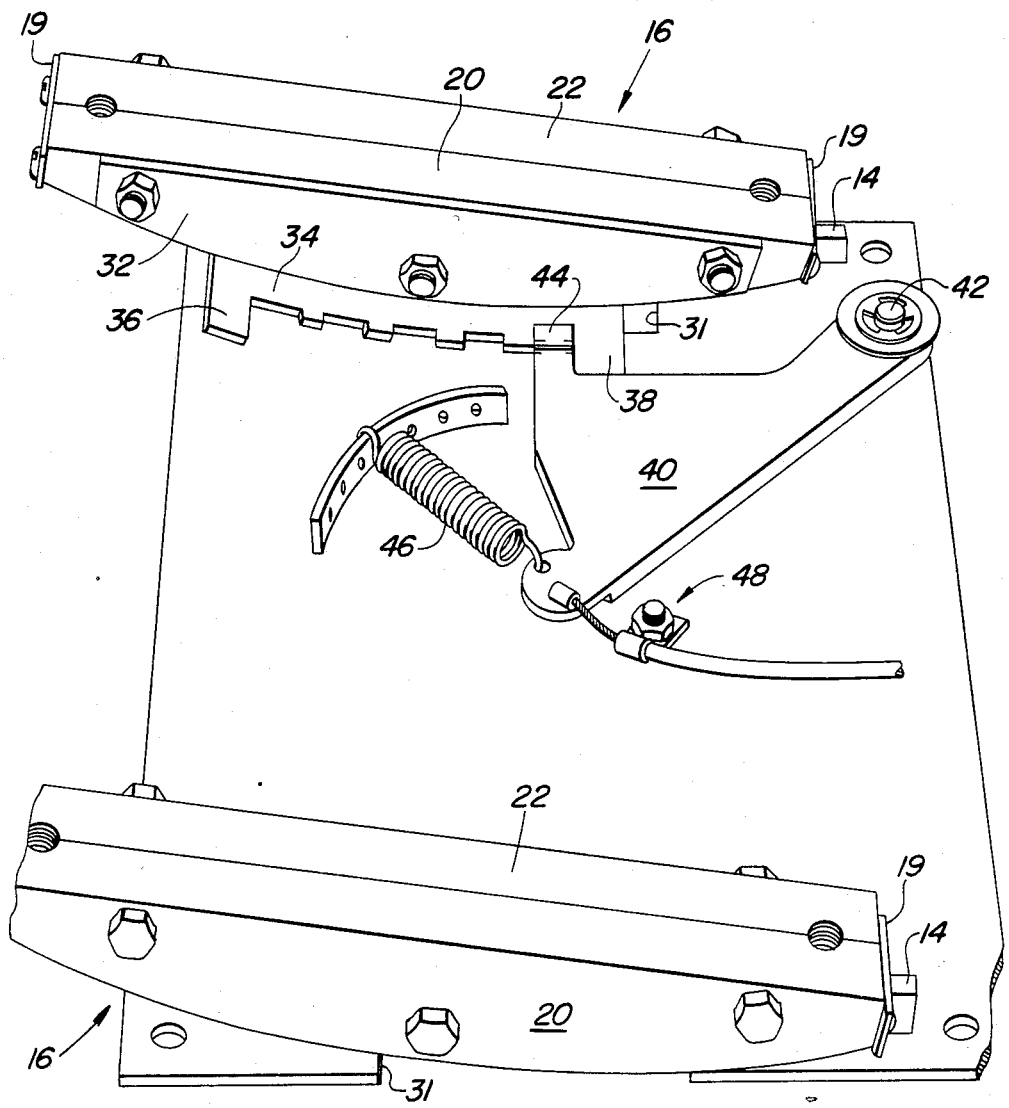
FIG. 4 is a view showing the front and rear guide members and the latching mechanism of the present invention.

A control device 50 is mounted in an easily accessible location on an end of an arm rest member 52 of the seat. Device 50 includes a lever 54 pivotally supported on the arm rest member 52 at pivot 56. The lever has a tab 58 for manipulation by the operator. One end of a sheathed cable linkage 60 is coupled to the other end 62 of lever 54. The other end of cable linkage is anchored to the stop 48 and is coupled to lever 40 so that when the operator moves tab 58 in the direction of arrow 70, the lever 40 pivots counterclockwise, viewing FIG. 4, and the lug 44 is disengaged from rack 34 so as to permit the guides 16 to move laterally along the arc of rails 14 to a desired position wherein the seat is level.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modification and variations which fall within the scope of the appended claims.

I claim:

1. A vehicle seat support system comprising:
    a platform rigidly mounted on the vehicle;
    an elongated arcuate rail member fixed to and projecting from the platform, extending along an arc of a circle, and having a first elongated bearing surface extending transversely to a fore-and-aft axis of the vehicle, the rail member comprising a vertically extending upright member and a horizontally extending cross member forming a T-shaped cross section, an upper surface of the cross member forming the first bearing surface;
    an elongated guide member supporting the seat and having an arcuate slot receiving the rail member, the guide member having a second elongated bearing surface extending transversely to the fore-and-aft axis, the guide member slot having a T-shaped cross sectional area;
    bearing means located in the slot for engaging the first and second bearing surfaces and for permitting lateral movement of the guide member relative to the rail member along an arc of a circle, the support system having at least one position wherein the entire first bearing surface is in contact with the bearing means and wherein the entire second bearing surface is in contact with the bearing means; and
    latch means for holding the seat in selected positions with respect to the platform.

2. The seat support of claim 1, wherein:
    the bearing means comprises a plastic sheet member resting on the upper surface of the cross member.

3. The seat support of claim 1, wherein the guide member is comprised of a pair of channel members fastened together on either side of the rail member, the channel members having complementary channels which together form the T-shaped slot which receives the rail member.

4. A vehicle seat support system comprising:
    a platform rigidly mounted on the vehicle;
    an elongated arcuate rail member fixed to and projecting from the platform, extending along an arc of a circle, and having a first elongated bearing surface extending transversely to a fore-and-aft axis of the vehicle;
    an elongated guide member supporting the seat and having an arcuate slot receiving the rail member, the guide member having a second elongated bearing surface extending transversely to the fore-and-aft axis;
    bearing means located in the slot for engaging the first and second bearing surfaces and for permitting lateral movement of the guide member relative to the rail member along an arc of a circle, the support system having at least one position wherein the entire first bearing surface is in contact with the bearing means and wherein the entire second bearing surface is in contact with the bearing means; and
    latch means for holding the seat in selected positions with respect to the platform, the latch means comprising an arcuate toothed rack projecting from and fixed to the guide member, a lever pivotal on the platform about a vertically extending pivot axis and releasably engageable with the rack to hold the guide member and seat in selected positions, and spring means for urging the lever towards engagement with the rack, the rack including abutments at opposite ends thereof, the platform having a stop member projecting therefrom for engaging the lever to limit pivoting of the lever away from the rack so that the lever is engageable with the abutments to limit lateral movement of the seat relative to the platform.

* * * * *